United States Patent [19]
Glans

[11] Patent Number: 5,900,471
[45] Date of Patent: May 4, 1999

[54] FILMS OF BLENDED NYLON RESINS AND LAMINATES THEREFROM

[75] Inventor: Jeffrey H. Glans, Morristown, N.J.

[73] Assignee: AlliedSignal Inc., Morris Township, N.J.

[21] Appl. No.: 08/832,292

[22] Filed: Apr. 3, 1997

[51] Int. Cl.$^6$ ............................ C08G 73/00; C08L 77/00
[52] U.S. Cl. .................. 528/170; 528/310; 528/322; 525/425; 525/432; 525/435; 525/436; 428/252; 428/315.9; 428/317.1; 428/411.1; 428/474.4; 264/165; 264/212; 264/216; 264/241; 264/258; 264/292
[58] Field of Search ................. 428/252, 474.4, 428/411.1, 317.1, 315.9; 528/170, 322, 310; 525/432, 435, 425, 436; 264/212, 216, 241, 258, 165, 292

[56] References Cited

U.S. PATENT DOCUMENTS

| | | | |
|---|---|---|---|
| 4,273,898 | 6/1981 | Kohn et al. | 525/432 |
| 4,847,142 | 7/1989 | Twilley et al. | 428/252 |
| 4,970,274 | 11/1990 | Chacko et al. | 525/432 |
| 5,153,275 | 10/1992 | Chacko et al. | 525/432 |
| 5,166,309 | 11/1992 | Maj et al. | 528/272 |
| 5,213,891 | 5/1993 | Maj et al. | 428/364 |
| 5,416,171 | 5/1995 | Chung et al. | 525/425 |
| 5,585,057 | 12/1996 | Trotta | 264/130 |
| 5,614,588 | 3/1997 | Steenblock et al. | 525/66 |
| 5,703,161 | 12/1997 | Steenblock et al. | 525/66 |

FOREIGN PATENT DOCUMENTS

| | | |
|---|---|---|
| 0 389 998 A2 | 10/1990 | European Pat. Off. . |
| 0 476 963 A2 | 3/1992 | European Pat. Off. . |
| 0 560 630 A1 | 9/1993 | European Pat. Off. . |
| 0 675 167 A1 | 10/1995 | European Pat. Off. . |
| 0 688 826 A1 | 12/1995 | European Pat. Off. . |

*Primary Examiner*—P. Hampton-Hightower
*Attorney, Agent, or Firm*—Roger H. Criss

[57] ABSTRACT

A composition which is a blend of at least two different polyetheramide copolymers, one having predominantly hard polyamide segments and one having predominantly soft polyether segments. When formed into a film and attached to a textile fabric, forms a laminate which is suitable for the production of surgical gowns, and the like. Such films are strong, have good moisture barrier properties while allowing the transmission of air therethrough and have a softness to which provides a clothlike feel.

23 Claims, No Drawings

FILMS OF BLENDED NYLON RESINS AND LAMINATES THEREFROM

BACKGROUND OF THE INVENTION

1. Field of the Invention

The present invention relates to polyetheramide copolymers and more particularly to blends of different polyetheramide copolymers, which when formed into a film and attached to textile fabrics form laminates which are suitable for the production of surgical gowns, and the like. Such films are strong, have good liquid barrier properties while allowing the transmission of moisture vapor therethrough and have a softness to which provides a clothlike feel.

2. Description of the Prior Art

It is well known in the art to prepare polyetheramide block copolymers. Such are useful for preparing a wide variety of useful articles such as moldings, fibers and films. In this regard, please see U.S. Pat. Nos. 4,273,898; 5,166,309 and 5,213,891. Blends of these materials with other polymers such as nylons produce compositions which have high impact strength, excellent heat deflection temperature and are useful as tough engineering plastics. Blends of polyetheramide copolymers with nylons are described in U.S. Pat. Nos. 5,416,171; 4,970,274 and 5,153,275. U.S. Pat. No. 5,416,171 recognizes that these copolymer materials are comprised of hard polyamide segments and soft polyether segments. U.S. Pat. Nos. 4,970,274 and 5,153,275 teach that prior art blends of polyamides and polyetheramide copolymers are exceptionally stiff This latter reference teaches certain blends of polyamides and polyetheramides with improved softness and film drape, however, it does not teach blends of different polyetheramide copolymers. U.S. Pat. No. 4,847,142 teaches a laminate of a polyetheramide copolymer and a layer of a textile material for use in producing water resistant garments, tents and tarpaulins. While these materials are water resistant, they are considered to be too stiff for applications requiring a soft feel, such as for the manufacture of garments like surgical gowns.

It would be desirable to produce compositions based on polyetheramide copolymers which produce films that have a soft clothlike feel, are water resistant, and allow moisture vapor passage therethrough. It would also be is desirable to provide films formed from such compositions, which when laminated to textile and nonwoven materials form soft fabrics suitable for the manufacture of garments.

SUMMARY OF THE INVENTION

The invention provides a blend of polyetheramide copolymers comprising:

a) from about 60 to about 95% by weight of a first polyetheramide copolymer having polyether segments and polyamide segments, wherein said polyether segments have the formula:

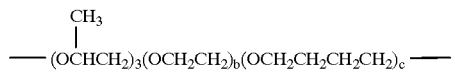

wherein each of a, b and c range from 0 to 1 and where a+b+c=1; and said polyamide segments are selected from the group consisting of:

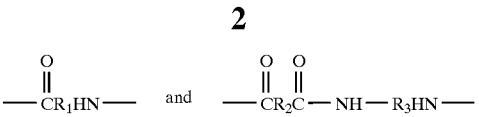

wherein $R_1$, $R_2$, and $R_3$ are each independently selected from the group consisting of alkylene or substituted alkylene groups of from about 4 to 13 carbon atoms, and difunctional aromatic groups, wherein said polyether segments comprise from about 1 to about 40% by weight of the first polyether amide, and wherein the molecular weight of each polyether segment ranges from about 100 to about 10,000 and the molecular weight of the first polyetheramide copolymer ranges from about 5,000 to about 200,000; and b) from about 5 to about 40% by weight of a second polyetheramide copolymer having polyether segments and polyamide segments, wherein said polyether segments have the formula:

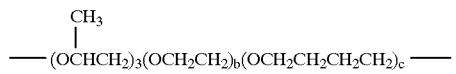

wherein each of a, b and c range from 0 to 1 and where a+b+c=1, and said polyamide segments are selected from the group consisting of:

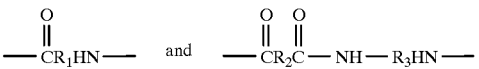

wherein $R_1$, $R_2$, and $R_3$ are each independently selected from the group consisting of alkylene or substituted alkylene groups of from about 4 to 13 carbon atoms, and difunctional aromatic groups, wherein said polyether segments comprise more than about 40% by weight of the second polyether amide; and wherein the molecular weight of each polyether segment ranges from about 100 to about 10,000 and the molecular weight of the second polyetheramide copolymer ranges from about 5,000 to about 200,000.

The invention also provides a flexible film layer comprising a layer of the above blend.

The invention also provides a flexible, laminated product comprising a film layer comprising a layer of the above blend and a textile material layer attached to the film layer.

The invention also provides method of producing a flexible, laminated product comprising providing a film layer comprising a layer of the above blend and attaching a textile material layer to the film layer.

The present invention provides a composition which are blends of polyetheramide copolymers, which when formed into a film and attached to textile fabrics form laminates which are suitable for the production of garments such as surgical gowns, and the like.

DETAILED DESCRIPTION OF THE PREFERRED EMBODIMENT

In the practice of the present invention, a composition is prepared which is broadly composed of a blend of at least two polyetheramide copolymers. A first polyetheramide has a significantly larger amount of hard polyamide segments compared to soft polyether segments and a second polyetheramide has a larger proportion of soft polyether segments than the first polyetheramide.

Each of the first polyetheramide copolymer and second polyetheramide copolymers have polyether segments and polyamide segments. In each case, the polyether segments have the formula:

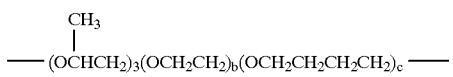

wherein each of a, b and c range from 0 to 1 and where a+b+c=1; and the polyamide segments are selected from the group consisting of:

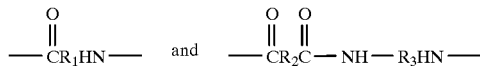

wherein $R_1$, $R_2$, and $R_3$ are each independently selected from the group consisting of alkylene or substituted alkylene groups of from about 4 to 13 carbon atoms, and difunctional aromatic groups. For purposes of this invention, the term "substituted" would be understood by those skilled in the art to mean having a substituent group which does not adversely affect the desired properties of the polyetheramide. Preferred alkylene and substituted alkylene groups nonexclusively include $C_5$ to $C_{11}$ alkylene for $R_1$, $C_4$ to $C_{10}$ alkylene for $R_2$ and $C_4$ to $C_{12}$ alkylene for $R_3$. Pendant groups on each of $R_1$, $R_2$ and $R_3$ may include methyl, ethyl, propyl, benzyl and phenyl radicals but unsubstituted $R_1$, $R_2$ and $R_3$ groups are preferred. Useful amide segments include those enumerated in U.S. Pat. No. 5,391,640, which is incorporated herein by reference. These include nylon 4, nylon 6, nylon 6,6, nylon 7, nylon 8, nylon 9, nylon 11, nylon 12, nylon 4,2, nylon 4,6, nylon 4,I, nylon 6,9, nylon 6,10, nylon 6,I, nylon MXD6, nylon 6,12, nylon 6,6,6, nylon 6,6/6I, nylon 6,6,6T, nylon trimethyl 6,2/6,2, nylon 6,6/6,9/6 and mixtures thereof. The most preferred amide segments are nylon 6, nylon 6,6 and nylon 12. The most preferred polyether segments are polyethylene oxide, polypropylene oxide and polytetramethylene oxide and mixtures thereof.

In the preferred embodiment, the molecular weight of each polyether segment in the first and second polyetheramides ranges from about 100 to about 10,000 and more preferably from about 125 to about 4,000. In the preferred embodiment, the molecular weight of the each of the first and second polyetheramide copolymer ranges from about 5,000 to about 200,000, more preferably from about 10,000 to about 100,000. For this invention, the term molecular weight means weight average molecular weight.

In the preferred embodiment the polyether segments of the first polyetheramide comprise from about 1 to about 40% by weight of the first polyether amide, more preferably from about 10 to about 35% by weight of the first polyetheramide and most preferably from about 15 to about 30% by weight of the first polyetheramide.

In the preferred embodiment the polyether segments of the second polyetheramide comprises more than about 40% by weight of the second polyether amide, more preferably from about 45% to about 75% by weight of the second polyetheramide and most preferably from about 50% to about 70% by weight of the second polyetheramide.

In the preferred embodiment the first polyetheramide comprises from about 60% to about 95% by weight of the blend, more preferably from about 75% to about 90% by weight by weight of the blend. In the preferred embodiment the second polyetheramide comprises from about 5% to about 40% by weight of the blend, more preferably from about 10% to about 25% by weight by weight of the blend.

The preparation of each of the first and second polyetheramides is well known in the art and suitable first and second polyetheramides are readily commercially available. One can adjust the amounts of each segment by changing the amounts of the respective starting materials. Methods for the preparation of the first polyetheramide are disclosed, for example in U.S. Pat. Nos. 4,847,142; 4,970,274; 5,153,275 and 3,654,370 which are incorporated herein by reference. Such are commercially available as Hydrofil® resins from AlliedSignal Inc. of Morristown, N.J. In the most preferred embodiment, the polyamide segments of the first polyether amide comprise nylon 6.

Methods for the preparation of the second polyetheramides are disclosed, for example, in U.S. Pat. Nos. 5,166,309 and 5,213,891, which are incorporated herein by reference. Such are commercially available as Pebax® resins from Elf Atochem. In the most preferred embodiment, the polyamide segments of the second polyether amide comprise nylon 12.

Films made from the first polyetheramide alone have good structural strength and moisture vapor transmission resistance properties; however, they are too stiff for producing garments. Films made from the second polyetheramide alone do not have adequate structural strength or film integrity; however, they feel much softer than films made from the first polyetheramide alone. The blends of this invention maintain good structural strength and moisture vapor transmission resistance properties and have an acceptably soft feel to the touch and have good drapability or hand.

The blends of this invention can optionally include additional ingredients known in the art such as binders, lubricants, coupling agents, glass fibers, and particulate fillers. Such fillers may be selected from a wide variety of minerals, metals, metal oxides, siliceous materials, metal salts, and mixtures thereof. These fillers may optionally be treated with various coupling agents or adhesion promoters, as is known to those skilled in the art. Examples of fillers included in these categories are titanium dioxide, alumina, aluminum hydrates, feldspar, asbestos, talc, calcium carbonates, clay, carbon black, quartz, novaculite and other forms of silica, kaolinite, bentonite, garnet, mica, saponite, beidelite, calcium oxide, calcium hydroxide, etc. Films made from the blends can contain plasticizers such as non-polymeric amides, and other minor additives which may be of value in the composition including antistatic agents, lubricants, nucleating agents, colorants, heat and light stabilizers, or other stabilizing aids.

The composition of the present invention is preferably made by melt blending the first and second polyetheramides and optional other ingredients in an extruder above the polymer melt temperature of both polyetheramide copolymers. The melt-blended composition is then formed into a film by conventional methods such as film blowing, extrusion or casting. The films of this invention may also be produced by other conventional methods useful in producing films, including coextrusion and extrusion lamination techniques. Suitable extrusion techniques are described in U.S. Pat. Nos. 5,139,878 and 4,677,017. Extrusion is preferably conducted at from about 200° C. to about 320° C., more preferably from about 220° C. to about 280° C. Extrusion techniques include methods which include the use of a feed block with a standard die used in forming films for forming flat cast films and cast sheets. The film can be oriented such as by uniaxial or biaxial stretching by methods well known to those skilled in the art. Typically for use in the present invention, the film can be produced at draw ratios of from about 1.5 to about 10 to 1. The term "draw ratio" is used herein to indicate the increase of dimension in the direction of the draw. Therefore, a film having a draw ratio of 2:1 has its length doubled during the drawing process. Generally, the film is drawn by passing it over a series of preheating and heating rolls. The heated polyetheramide film moves through a set of nip rolls downstream at a faster rate than the film entering the nip rolls at an upstream location. In such a stretching operation, the film may be stretched uniaxially in either the direction coincident with the direction of movement of the film being withdrawn from the casting roll, also referred to in the art as the "machine direction", or in as direction which is perpendicular to the machine direction, and referred to in the art as the "transverse direction", or biaxially in both the machine direction and the transverse direction, either simultaneously, or sequentially.

Although the film thickness may vary widely, the post-stretched film thickness is preferably from about 0.05 mils (1.3 $\mu$m) to about 100 mils (2540 $\mu$m), and more preferably from about 0.5 mils (13 $\mu$m) to about 2 mils (51.8 $\mu$m). While such thicknesses are preferred, it is to be understood that other film thicknesses may be produced to satisfy a particular need and yet fall within the scope of the present invention.

The polytheramide films may optionally be attached to another thermoplastic film to form a multilayered structure. Such a multilayer film article comprises the polyetheramide film of the invention attached to at least one thermoplastic layer comprising at least one thermoplastic homopolymer or copolymer. Such thermoplastic layers are well known in the art. Thermoplastics nonexclusively include polyolefins, polyamides, polyesters, polystyrene, polycarbonates, vinyl polymers, and copolymers and blends thereof Most preferred are polyesters and polyamides. Multilayered structures may be produced by standard coextrusion techniques or the layers may be attached by lamination or via an intermediate adhesive. Suitable coextrusion techniques are described in U.S. Pat. Nos. 5,139,878 and 4,677,017. Suitable adhesive layers, in accordance with the present invention include modified polyolefin compositions having at least one functional moiety selected from the group consisting of unsaturated polycarboxylic acids and anhydrides thereof. The modified polyolefins suitable for use in this invention include compositions described in U.S. Pat. Nos. 3,481,910; 3,480,580; 4,612,155 and 4,751,270. Other adhesive layers non-exclusively include alkyl ester copolymers of olefins and alkyl esters of $\alpha,\beta$-ethylenically unsaturated carboxylic acids such as those described in U.S. Pat. No. 5,139,878. A typical multilayered film structure includes a three-layer structure, which comprises a thermoplastic layer, an adhesive layer and a polyetheramide blend layer. Another typical film structure is a five-layer structure, which comprises a thermoplastic layer, an adhesive layer, a polyetheramide blend layer, an adhesive layer and a thermoplastic layer.

These are only two of many possible combinations of multilayer film structures, and any variation of the order and thickness of the layers of the polyetheramide blend and thermoplastic layer can be made. Alternatively, the multilayer films of the present invention can be produced by lamination whereby a multilayer film structure is formed from prefabricated film plies. The basic methods used in film laminating techniques are fusion, wet combining, and heat reactivating. Fusion, which is a method of laminating two or more film plies using heat and pressure without the use of other adhesives can only be used where the films being laminated are comprised of polymers that readily form interfacial adhesion. Wet combining and heat reactivating are utilized in laminating incompatible films using adhesive materials.

The polyetheramide blend films of this invention are particularly useful when attached to a textile material and formed into a garment. The flexible, laminated product of the present invention comprises a layer of the water resistant polyetheramide blend film described above and a textile material layer, including nonwovens. These layers may attached in a variety of ways, for instance by heat lamination or through the use of an adhesive. The adhesive to be used depends both on the composition of the polyetheramide copolymer and the type of textile material. It has been found that generally favorable results are obtained by using a fusible polyamide as the adhesive for polyamide textile materials, similarly, fusible polyesters would be expected to perform well with a polyester textile material. Other constructions are contemplated, for example a three layer product wherein the polyetheramide copolymer film is flanked by layers of textile material. In a particularly preferred construction, a fabric is made by laminating the described polyetheramide film to the textile layer. Nonexclusive examples of suitable textile materials may be polyester, polypropylene, rayon, cotton, acrylics and polyamides such as nylon 6, nylon 12. Construction of the laminate will determine whether the layers remain discrete or whether they mix together, e.g., as in a double knit fabric where one side would remain predominantly hydrophilic and the other predominantly hydrophobic. The hydrophobic layer may form the interior of the article (for garments) with the hydrophilic film layer forming the exterior. With this product, moisture is pushed away from the wearer's skin through the hydrophobic layer and into the hydrophilic layer. Vapor molecules are then released into the atmosphere through the vapor permeable (hydrophilic) film layer. The presently preferred textile material is a hydrophilic nylon 6, preferably woven for strength and abrasion resistance; however, knitted or nonwoven polyamide materials may also be used. By hydrophilic is meant moisture and high water absorptive. By hydrophobic is meant relatively non-water absorptive. Nonwovens are well known in the art as exemplified by U.S. Pat. No. 5,593,395 which is incorporated herein by reference.

Although there are quantitative measures for determining the drape and hand properties of film, a person experienced in judging the drape and the hand properties of film can discriminate between films based on subjective aspects of the film as well as measurable aspects. An attempt to quantify this has been made in the Examples below where A is judged as film which has the best drape and feel, while a B rated film is desirable and a C-rated film is the least desirable for these purposes based on a comparison. This is not to say that a C-rated film would not be useful, but rather that the A–C ratings are a comparative indication of the drape or hand feel to one experienced in judging these films. In preparing a film with a soft hand, it is desirable for the film to have a low initial modulus value, while maintaining good ultimate tensile strength and ultimate elongation. This combination of characteristics permits the film to drape, or conform, easily to a mold form, yet permits stretching of the film to conform to the mold under differential pressure, and further permits ready removability of the film from the mold after the forming operation has been concluded.

Moisture vapor transmission rate (MVTR) may be measured via the procedure set forth in ASTM E96-Method B (Upcup Method). In the preferred embodiment, the flexible, laminated film/textile product according to this invention has a MVTR of from about 200 to about 2,000 gm/m$^2$/day, preferably from about 300 to about 1,500 gm/m$^2$/day, and more preferably from about 400 to about 1,000 gm/m$^2$/day. The most preferred MVTR of the film and the laminated film/textile product is about 500 gm/m$^2$/day or more.

The following non-limiting examples serve to illustrate the invention.

EXAMPLES

Preparation of Poly(etheramides)

A 250 gallon agitated reactor was charged with 324.6 lb. of caprolactam, 14 lb. of deionized water, 112.6 lb. of polyether diamine (Jeffamine® XTJ 502, available from Huntsman Chemical Company), 8.18 lb. of terephthalic acid, 3.5 lb. of polyether (Huntsman PED 2003), 20 g of 50% hypophosphorous acid, 1532 g of antioxidant (Irganox® 1010, available from Ciba Geigy) and 20 g of antifoam (Dow Corning 36). The reaction mixture was heated for 2 hours at 255° C. under nitrogen at 60 psig. The pressure was then reduced to 200 mmHgA at a rate of 1.0 lb./min. The batch was run to a final torque reading of 35.0 in-lb. at which point the polymer was extruded through the bottom into a quench tank and pelletized. The resulting pellets were leached with water at 120° C. for a total of three washes. The leached resin was then dried. This resin had a final FAV of 35.1 (ASTM D-789).

Film Preparation

The three-extruder system is comprised of two 3.2 cm (1¼", one with L/D=24/1, and the other with L/D=3011), and one 3.8 cm (1½" with UD=24/1) Killion single screw extruders. The polyetheramide resins were fed into the 3.8 cm extruder with extruder temperature profiles set at 238, 254, 260° C. for the heating zone 1 –3 and 260° C. for the adapters. The melt temperature was measured at 256° C. The extrudate, after passing through a coextrusion film die kept at 260° C., was then cast on a roll maintained at 60° C., followed by a cooling roll set at 39° C. Coextruded films were prepared by adding the blend to the 3.8 cm extruder and the single resin to one of the 3.2 cm extruders.

Testing

Film samples were tested for mechanical properties according to ASTM-D882. Measurements were run according to ASTM E-96-94 method B (upcup method) at 73° F. (23° C.) and 50% RH.

Film softness was measure quantitatively and assigned a value from A–C where C is the softness of the control, B is slightly softer and A significantly softer than the control. In general all of the blends were significantly softer than the controls.

EXAMPLES 1–2

Blends of a polyetheramide containing 85% nylon 6 and 15% by weight of polyethyleneoxide terepthalamide and different amounts Pebax MV6200 were prepared and cast into 1–1.5 mil film.

|  | Control | Example 1 | Example 2 |
| --- | --- | --- | --- |
| % MV6200 by weight | 0 | 20 | 40 |
| thickness (mil) | 1.5 | 1.1 | 1.1 |
| MVTR (upcup) g/m²/d | 249 | 294 | — |

|  | MD | TD | MD | TD | MD | TD |
| --- | --- | --- | --- | --- | --- | --- |
| Tensile Str (ksi) | 9.6 | 11.2 | 12.1 | 9.8 | 10.7 | 7.2 |
| Ten. Modulus (ksi) | 77.5 | 93.7 | 57.6 | 58.4 | 38.2 | 35.7 |
| Ult. Elongation (%) | 286 | 391 | 427 | 387 | 434 | 414 |

| softness | C | A | A |
| --- | --- | --- | --- |

MD = Machine Direction
TD = Transverse Direction

These results such show that the films of Examples 1 and 2 are significantly softer than the control.

EXAMPLES 3–6

Blends of a polyetheramide containing 85% nylon 6 and 15% by weight of polyethylenoxide terepthalamide and different amounts of Pebax MV3000 or Pebax 1074 were prepared and cast into 0.6–0.8 mil film.

|  | Control | Example 3 | Example 4 | Example 5 | Example 6 |
| --- | --- | --- | --- | --- | --- |
| % MV3000 by weight | 0 | 20 | 40 |  |  |
| % MV1074 by weight | 0 | 0 | 0 | 20 | 40 |
| Thickness (mil) | 0.6 | 0.6 | 0.6 | 0.8 | 0.7 |
| MVTR (upcup) g/m²/d | 300 | 292 | 316 | 320 | 360 |
| Softness | C | A | A | A | A |

These results such show that the films of Examples 3 though 6 are significantly softer than the control.

These results such show that the films of Examples 3 though 6 are significantly softer than the control.

EXAMPLES 7–9 (COEXTRUDED STRUCTURES)

Coextrusions were produced of one layer (~0.6 mil) comprised of a blend of Hydrofil and Pebax and a second layer (~0.4mil) comprising solely of Pebax.

|  | Example 7 | Example 8 | Example 9 |
| --- | --- | --- | --- |
| Layer 1 | 20% MV3000 | 20% MV1074 | 40% MV1074 |
| Layer 2 | MV3000 | MV1074 | MV1074 |
| Thickness (mil) | 1.0 | 0.9 | 1.1 |
| MVTR (upcup) g/m²/d | 301 | 326 | 322 |

|  | MD | TD | MD | TD | MD | TD |
| --- | --- | --- | --- | --- | --- | --- |
| Tensile Str (ksi) | 8.7 | 7.0 | 8.7 | 7.4 | 8 5 | 6.6 |
| Tensile Modulus (ksi) | 40.2 | 38.7 | 48.3 | 49.2 | 41.3 | 35.8 |
| Ultimate Elongation (%) | 434 | 409 | 404 | 355 | 456 | 457 |

| Softness | A | A | A |
| --- | --- | --- | --- |

These results such show that the compositions of Examples 7 through 9 produce soft films.

EXAMPLES 10–14

Blends of polyetheramide containing 70% nylon 6 and 30°% by weight of polyethylenoxide terepthalamide and Pebax MV3000 or Pebax 1074 were prepared and cast into 1.0–1.3 mil film.

|  | Control | Example 10 | Example 11 | Example 12 | Example 13 | Example 14 |
|---|---|---|---|---|---|---|
| % MV 3000 by weight | 0 | 0 | 10 | 20 | 30 | 20 |
| % MV 1074 by weight | 0 | 20 | 0 | 0 | 0 | 0 |
| Thcikness (mil) | 1.3 | 1.1 | 1.0 | 1.0 | 1.1 | 1.0 |
| MVTR (upcup) g/m²/d | 526 | 538 | 502 | 504 | 479 | 594 |
|  | MD TD | MD TD | MD TD | MD TD | MD TD | MD TD |
| Tensile Str (ksi) | 12.2  8.8 | 11.8  7.6 | 12.7  10.1 | 13.6  9.3 | 10.7  7.4 | 12.7  8.9 |
| Ten. Modulus (ksi) | 37.5  34.2 | 37.4  38.4 | 41.5  41.1 | 35.9  46.4 | 32.4  32.4 | 42.8  46.4 |
| Ult. Elongation (%) | 427  448 | 482  452 | 472  510 | 424  520 | 479  493 | 425  477 |
| Softness | C | A | A | A | A | A |

These results indicate that films produced according to Examples 10–14 are significantly softer than the control.

EXPERIMENTS 15–17

Blends of polyetheramide containing 60% nylon 6 and 40% by weight of polyethylenoxide terepthalamide and varying amounts of Pebax MV3000 were prepared and cast into 0.8 mil film.

|  | Example 15 | Example 16 | Example 17 |
|---|---|---|---|
| % MV3000 by weight | 0 | 10 | 20 |
| Thickness (mil) | 0.7 | 0.8 | 0.8 |
| MVTR (upcup) g/m²/d | 853 | 784 | 791 |
|  | MD TD | MD TD | MD TD |
| Tensile Str (ksi) | 6.4  9.2 | 9.1  8.4 | 9.3  8.1 |
| Ten. Modulus (ksi) | 33.9  36.9 | 32.9  33.6 | 31.9  31.6 |
| Ult. Elongation (%) | 340  524 | 466  487 | 461  471 |
| Softness | C | A | A |

These results indicate that films produced according to Examples 16 and 17 are significantly softer than a film produced according to Example 15.

It can be seen that the present invention provides compositions of blends of polyetheramides as well as films formed thereof. These films can be laminated to fabrics which have desirable feel and MVTR and can be made into surgical gowns.

What is claimed is:

1. A blend of polyetheramide copolymers comprising:

a) from about 60 to about 95% by weight of a first polyetheramide copolymer having polyether segments and polyamide segments, wherein said polyether segments have the formula:

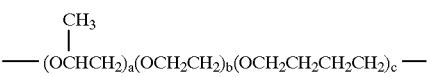

wherein each of a, b and c range from 0 to 1 and where a+b+c=1; and said polyamide segments are selected from the group consisting of:

wherein $R_1$, $R_2$, and $R_3$ are each independently selected from the group consisting of alkylene or substituted alkylene groups of from about 4 to 13 carbon atoms, and difunctional aromatic groups, wherein said polyether segments comprise from about 1 to about 40% by weight of the first polyether amide; and wherein the weight average molecular weight of each polyether segment ranges from about 100 to about 10,000 and the weight average molecular weight of the first polyetheramide copolymer ranges from about 5,000 to about 200,000; and b) from about 5 to about 40% by weight of a second polyetheramide copolymer having polyether segments and polyamide segments, wherein said polyether segments have the formula:

$$\text{---}(OCHCH_2)_a(OCH_2CH_2)_b(OCH_2CH_2CH_2CH_2)_c\text{---}$$
$$\overset{|}{CH_3}$$

wherein each of a, b and c range from 0 to 1 and where a+b+c=1; and said polyamide segments are selected from the group consisting of:

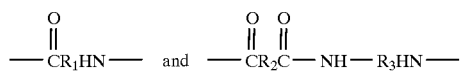

wherein $R_1$, $R_2$, and $R_3$ are each independently selected from the group consisting of alkylene or substituted alkylene groups of from about 4 to 13 carbon atoms, and difunctional aromatic groups, wherein said polyether segments comprise more than about 40% by weight of the second polyether amide; and wherein the weight average molecular weight of each polyether segment ranges from about 100 to about 10,000 and the weight average molecular weight of the second polyeiheramide copolymer ranges from about 5,000 to about 200,000.

2. The blend of claim 1 wherein the molecular weight of each polyether segment ranges from about 125 to about 4,000.

3. The blend of claim 1 wherein the molecular weights of the first and second polyetheramide copolymers each range from about 10,000 to about 100,000.

4. The blend of claim 1 wherein the polyether segments of the first polyetheramide comprise from about 10 to about 35% by weight of the first polyetheramide.

5. The blend of claim 1 wherein the polyether segments of the first polyetheramide comprise from about 15 to about 30% by weight of the first polyetheramide.

6. The blend of claim 1 comprising from about 75 to about 90% by weight of the first polyetheramide copolymer.

7. The blend of claim 1 wherein the polyether segments of the second polyetheramide comprise from about 45% to about 75% by weight of the second polyetheramide.

8. The blend of claim 1 wherein the polyether segments of the second polyetheramide comprise from about 50% to about 70% by weight of the second polyetheramide.

9. The blend of claim 1 comprising from about 10 to about 25% by weight of the second polyetheramide copolymer.

10. The blend of claim 1 wherein the polyamide segments of the first polyether amide comprise nylon 6.

11. The blend of claim 10 wherein the polyamnide segments of the second polyether amide comprise nylon 12.

12. The blend of claim 1 wherein the polyamide segments of the second polyether amide comprise nylon 12.

13. A film which comprises a layer of the blend of polyetheramide copolymers according to claim 1.

14. A film which comprises a layer of the blend of polyetheramide copolymers according to claim 10.

15. A film which comprises a layer of the blend of polyetheramide copolymers according to claim 11.

16. A film which comprises a layer of the blend of polyetheramide copolymers according to claim 12.

17. The film according to claim 13 wherein said film has been oriented.

18. A multilayer film article which comprises the film of claim 13 attached to at least one thermoplastic layer comprising at least one thermoplastic homopolymer or copolymer.

19. The multilayer film article of claim 18 wherein the film has been attached to a surface of the thermoplastic layer by an intermediate adhesive layer.

20. A flexible, laminated product comprising i) a film layer comprising a layer of a blend of polyetheramide copolymers comprising:

a) from about 60 to about 95% by weight of a first polyetheramide copolymer having polyether segments and polyamide segments, wherein said polyether segments have the formula:

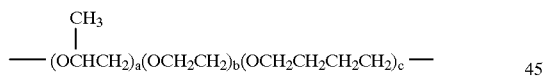

wherein each of a, b and c range from 0 to 1 and where a+b+c=1; and said polyamide segments are selected from the group consisting of:

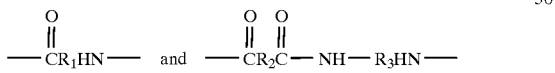

wherein $R_1$, $R_2$, and $R_3$ are each independently selected from the group consisting of alkylene or substituted alkylene groups of from about 4 to 13 carbon atoms, and difunctional aromatic groups, wherein said polyether segments comprise from about 1 to about 40% by weight of the first polyether amide; and wherein the weight average molecular weight of each polyether segment ranges from about 100 to about 10,000 and the weight average molecular weight of the first polyetheramide copolymer ranges from about 5,000 to about 200,000; and b) from about 5 to about 40% by weight of a second polyetheramide copolymer having polyether segments and polyamide segments, wherein said polyether segments have the formula:

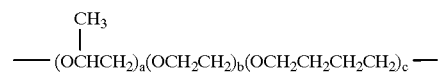

wherein each of a, b and c range from 0 to 1 and where a+b+c=1; and said polyamide segments are selected from the group consisting of:

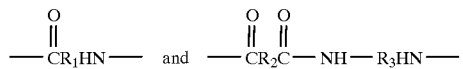

wherein $R_1$, $R_2$, and $R_3$ are each independently selected from the group consisting of alkylene or substituted alkylene groups of from about 4 to 13 carbon atoms, and difunctional aromatic groups, wherein said polyether segments comprise more than about 40% by weight of the second polyether amide; and wherein the weight average molecular weight of each polyether segment ranges from about 100 to about 10,000 and the weight average molecular weight of the second polyetheramide copolymer ranges from about 5,000 to about 200,000; and ii) a textile material layer attached to the film layer.

21. The laminated product of claim 20 wherein the film has been attached to the textile material layer by an intermediate adhesive layer.

22. A garment which comprises the flexible, laminated product of claim 20.

23. A method of producing a flexible, laminated product comprising i) providing a film layer comprising a substantially uniform layer of a blend of polyetheramide copolymers comprising:

a) from about 60 to about 95% by weight of a first polyetheramide copolymer having polyether segments and polyamide segments, wherein said polyether segments have the formula:

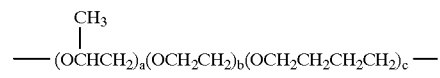

wherein each of a, b and c range from 0 to 1 and where a+b+c=1; and said polyamide segments are selected from the group consisting of:

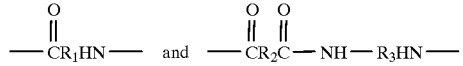

wherein $R_1$, $R_2$, and $R_3$ are each independently selected from the group consisting of alkylene or substituted alkylene groups of from about 4 to 13 carbon atoms, and difunctional aromatic groups, wherein said polyether segments comprise from about 1 to about 40% by weight or the first polyether amide; and wherein the weight average molecular weight of each polyether segment ranges from about 100 to about 10,000 and the weight average molecular weight of the first polyetheramide copolymer ranges from about 5,000 to about 200,000; and b) from about 5 to about 40% by weight of a second polyetheramide copolymer having polyether segments and polyamide segments, wherein said polyether segments have the formula:

—(OCHCH$_2$)$_a$(OCH$_2$CH$_2$)$_b$(OCH$_2$CH$_2$CH$_2$CH$_2$)$_c$—  (5)

with CH$_3$ substituent on the first unit, wherein each of a, b and c range from 0 to 1 and where a+b+c=1; and said polyamide segments are selected from the group consisting of:

—CR$_1$HN—  and  —CR$_2$C(=O)—NH—R$_3$HN—

(with C=O groups as shown)

wherein $R_1$, $R_2$, and $R_3$ are each independently selected from the group consisting of alkylene or substituted alkylene groups of from about 4 to 13 carbon atoms, and difunctional aromatic groups, wherein said polyether segments comprise more than about 40% by weight of the second polyether amide; and wherein the weight average molecular weight of each polyether segment ranges from about 100 to about 10,000 and the weight average molecular weight of the second polyetheramide copolymer ranges from about 5,000 to about 200,000; and ii) attaching a textile material layer to the film layer.

* * * * *